United States Patent
Pan et al.

(10) Patent No.: US 7,702,810 B1
(45) Date of Patent: Apr. 20, 2010

(54) DETECTING A LABEL-SWITCHED PATH OUTAGE USING ADJACENCY INFORMATION

(75) Inventors: Ping Pan, Emerson, NJ (US); Der-Hwa Gan, Fremont, CA (US); Nischal Sheth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1074 days.

(21) Appl. No.: 10/357,262

(22) Filed: Feb. 3, 2003

(51) Int. Cl.
G06F 15/173 (2006.01)
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. .................. 709/242; 370/216; 370/217
(58) Field of Classification Search .............. 370/216, 370/351, 386, 466; 709/238–240, 242, 390; 398/9, 79
See application file for complete search history.

(56) References Cited

U.S. PATENT DOCUMENTS

| 6,374,303 B1* | 4/2002 | Armitage et al. ............ 709/242 |
| 6,973,084 B1* | 12/2005 | Jha ............................ 370/392 |
| 7,012,919 B1* | 3/2006 | So et al. ..................... 370/392 |
| 7,120,683 B2* | 10/2006 | Huang ........................ 709/223 |
| 7,164,652 B2* | 1/2007 | Puppa et al. ................. 370/225 |
| 2001/0043585 A1* | 11/2001 | Hummel ..................... 370/351 |
| 2002/0004843 A1* | 1/2002 | Andersson et al. .......... 709/238 |
| 2002/0093954 A1* | 7/2002 | Weil et al. ................... 370/389 |
| 2002/0191247 A1* | 12/2002 | Lu et al. ..................... 359/124 |
| 2003/0063613 A1* | 4/2003 | Carpini et al. .............. 370/401 |
| 2003/0112749 A1* | 6/2003 | Hassink et al. .............. 370/225 |
| 2003/0112760 A1* | 6/2003 | Puppa et al. ............. 370/241.1 |
| 2003/0189920 A1* | 10/2003 | Erami et al. ................. 370/351 |
| 2003/0204768 A1* | 10/2003 | Fee ................................. 714/4 |
| 2003/0212927 A1* | 11/2003 | Navar et al. ................... 714/47 |
| 2004/0202112 A1* | 10/2004 | McAllister et al. .......... 370/252 |

OTHER PUBLICATIONS

Sandick et al., "Fast LIveness Protocol (FLIP)," *draft-sandick-flip-00.txt* (IETF, Feb. 2000) pp. 1-19.
Lang et al., "Link Management Protocol (LMP)," *draft-ietf-ccamp-lmp-07.txt* (IETF, Nov. 2002) pp. 1-70.

\* cited by examiner

*Primary Examiner*—David E England
(74) *Attorney, Agent, or Firm*—Straub & Pokotylo; John C. Pokotylo

(57) ABSTRACT

Outages in a label-switched path (LSP) are detected quickly using adjacency information, such as IGP "hello neighbor" queries. Protocols, such as IGP can be instructed to check certain adjacencies more frequently. For example, a node in an LSP can determine a next downstream node in the LSP as an adjacency, check that adjacency much more frequently, and in the event that the adjacency is lost (due to a down link, a down interface, or a down node), switch any LSPs that have the adjacency to a failover path or route. Since these checks need not be performed using hardware signaling, outages of shared media interfaces, such as Ethernet and Gigabit Ethernet, can be checked.

35 Claims, 6 Drawing Sheets

DETECTING A LABEL-SWITCHED PATH OUTAGE USING ADJACENCY INFORMATION

§1. BACKGROUND OF THE INVENTION

§1.1 Field of the Invention

The present invention concerns detecting errors in connections, such as multi-protocol label switching (MPLS) label-switched paths (LSPs).

§1.2 Description of Related Art

The description of art in this section is not, and should not be interpreted to be, an admission that such art is prior art to the present invention. Although one skilled in the art will be familiar with networking, circuit switching, packet switching, and label-switched paths, each is briefly introduced below for the convenience of the reader less skilled in the art. More specifically, circuit-switched and packet-switched networks and the need for label-switched paths are introduced in §1.2.1. Then, label-switched path failures, some known failure responses, and their limitations are introduced in §1.2.2 below.

§1.2.1 Circuit-Switched Networks and Packet-Switched Networks, and the Need for Label-Switched Paths Circuit-switched networks establish a connection between hosts (parties to a communication) for the duration of their communication. The public-switched telephone network ("PSTN") is an example of a circuit-switched network, where parties to a call are provided with a connection for the duration of the call. Unfortunately, for communications of short, infrequent "bursts" of data between hosts, providing a connection for the duration of a call simply wastes communications resources when no data is being transferred. The desire to avoid such inefficiencies has lead to the development of packet-switched networks.

Packet-switched networks forward addressed data (referred to as "packets" in the specification below without loss of generality), typically on a best efforts basis, from a source to a destination. Many large packet-switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with (e.g., terminates) multiple links.

Packets traverse the network by being forwarded from router to router until they reach their destinations (as typically specified by so-called layer-3 addresses in the packet headers). Routers exchange route information and develop forwarding information based on the route information. The forwarding information defines which output port is associated with a particular destination address or a portion of a destination address. Unlike switches, which establish a connection for the duration of a "call" or "session" and send data received on a given input port out on a given output port, routers typically examine the destination address of each packet and use the forwarding information to determine from the destination address the appropriate output port on which to send each packet.

In some cases, using known routing protocols (e.g., shortest path algorithms) to determine routes and forwarding information is becoming unacceptable in light of the ever-increasing volume of Internet traffic and the mission-critical nature of some Internet applications. Such known routing protocols can actually contribute to network congestion if they do not account for bandwidth availability and traffic characteristics when constructing routing and forwarding tables. To alleviate or avoid this problem, traffic flows can be mapped onto an existing physical topology, thereby moving traffic flows away from congested shortest paths to a less congested path. Alternatively, paths can be determined autonomously, even on demand. Label-switching can be used to establish a fixed path from a head-end node (e.g., an ingress router) to a tail-end node (e.g., an egress router). Once a path is determined, each router in the path may be configured manually or via some signaling mechanism to forward packets to a peer (e.g., a "downstream" neighbor) router in the path. Routers in the path determine that a given set of packets (e.g., a flow), are to be sent over the fixed path (as opposed to being routed individually) based on unique labels added to the packets.

The path generated may be an LSP. More specifically, the operations of forwarding a packet to a next hop based on address information can be thought of as two steps—partitioning the entire set of possible packets into a set of forwarding equivalence classes (FECs), and mapping each FEC to a next hop. As far as the forwarding decision is concerned, different packets which get mapped to the same FEC are indistinguishable. With MPLS, a packet is assigned to a particular FEC just once, as the packet enters the label-switched domain of the network. The FEC to which the packet is assigned is encoded as a label, typically a short, fixed length value. Thus, at subsequent nodes no further header analysis need be done—all subsequent forwarding over the label-switched domain is driven by the labels. FECs may be generalized such that particular ports, wavelengths, time slots, channels, etc. are used instead of, or encoded by, labels.

FIG. 1 illustrates an LSP 110 across a network. Notice that LSP 110 is simplex—traffic flows in one direction from a head-end label-switching router (LSR) 120 at an ingress edge through several LSRs to a tail-end LSR 130 at an egress edge. Generally, duplex traffic requires two LSPs—one for each direction. Notice also that LSP 110 is defined by the concatenation of one or more label-switched hops, allowing a packet to be forwarded from one LSR to another across the MPLS domain defined by LSP 110.

LSR 130 interprets the destination address of each unlabeled packet, performs a longest-match routing table lookup, maps the packet to an FEC, assigns a label to the packet based on the FEC, and forwards it to the next hop in the LSP. In the MPLS domain, the LSRs ignore the packet's network layer address and simply forward the packet using label-swapping. When the labeled packet arrives at the egress LSR, if the next hop is not an LSR the egress LSR discards ("pops") the label and forwards the packet using conventional (e.g., longest-match IP) forwarding. Alternatively, a penultimate LSP can discard the label before the packet is forwarded to the egress LSR.

§1.2.2 "Failures" in a Label-Switched Path

As shown in FIG. 1, if a connection (link$_2$) between two LSRs fails, traffic may be switched over to one or more "failover" links which may be an LSP itself. Some routers have "fast reroute" capabilities where a router upstream of a failed connection (e.g., a failed link, neighboring node, or interface) switches over to another connection while the ingress router determines a new LSP. The draft, "Fast Reroute Extensions to RSVP-TE for LSP Tunnels", Ping Pan Ed., draft-ietf-mpls-rsvp-lsp-fastreroute-00.txt (the Internet Engineering Task Force January 2002) (referred to as "the fast reroute draft" and incorporated by reference) describes one fast reroute scheme. Although such fast reroute techniques facilitate fast switchover (e.g., on the order of msec) after a failed connection is detected, detecting the failed connection can take too long in many instances.

Some protocols for managing LSPs (such as the Resource Reservation Protocol-Traffic Engineering (RSVP-TE)) use so-called "neighbor hellos" to get adjacency information, but the period of the hellos is too long (e.g., one to three seconds) for some failover purposes. If the protocol waits to miss a few expected hellos before concluding that a connection is down, the time to detect a down connection can be ~15 seconds. During this time, a lot of important data can be lost! The request for comments, "RSVP-TE: Extensions to RSVP for LSP Tunnels," Awduche et al., *Request for Comments:* 3209 (the Internet Engineering Task Force December 2001) (incorporated by reference) describes RSVP-TE.

Although some hardware signaling techniques for checking connections exist (e.g., SONET Automatic Protection Switching (APS), data carrier connect, etc.), and such hardware signaling techniques may be fast, many shared media interfaces, such as Gigabit Ethernet for example, do not currently support hardware signaling. Accordingly, adjacencies or connections that use such interfaces cannot be checked quickly.

§2. SUMMARY OF THE INVENTION

Apparatus, data structures, and methods consistent with the principles of the invention quickly detect an LSP outage based on adjacency information. The invention may quickly detect an LSP outage by using protocols, such as the Interior Gateway Protocol (IGP) for example, to check certain adjacencies more frequently. For example, a node in an LSP can determine a next downstream node in the LSP as an adjacency, check that adjacency much more frequently, and, if the adjacency is lost (due to a down link, a down interface, or a down node), switch any LSPs that have the adjacency to a failover connection (e.g., a backup link, path, or route).

§3. BRIEF DESCRIPTION OF THE DRAWINGS

§4. DETAILED DESCRIPTION

Methods, apparatus and data structures consistent with the principles of the invention quickly detect outages in LSPs. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the invention is not limited to the embodiments shown and the inventors regard their invention as the following disclosed methods, apparatus and data structures and any other patentable subject matter.

In the invention, the concept of "labels" is not limited to labels normally associated with LSPs, and may be used more generally to differentiate wavelength-switched paths, channel-switched paths, time-slot-switched paths, an ATM virtual circuit path, or other types of generalized paths. A "connection" or "adjacency" can be considered to be "down" for a variety of reasons, such as if an interface is not functioning, a link is not functioning, or a neighbor node is not functioning.

An exemplary environment in which the present invention may operate is described in §4.1. Then, apparatus, methods, and data structures that may be used to perform operations consistent with the principles of the present invention are described in §4.2. An example illustrating operations preformed by an exemplary embodiment of the invention is then provided in §4.3. Finally, some conclusions regarding the present invention are set forth in §4.4.

§4.1 ENVIRONMENT IN WHICH THE INVENTION May Operate

The invention may be used in communication systems including nodes for forwarding addressed data, such as packets. Such nodes may be routers. For example, the invention may be used to quickly detect a down connection (e.g., a down link, node, or interface) and may be used in conjunction with a fast reroute technique.

Figure 1:
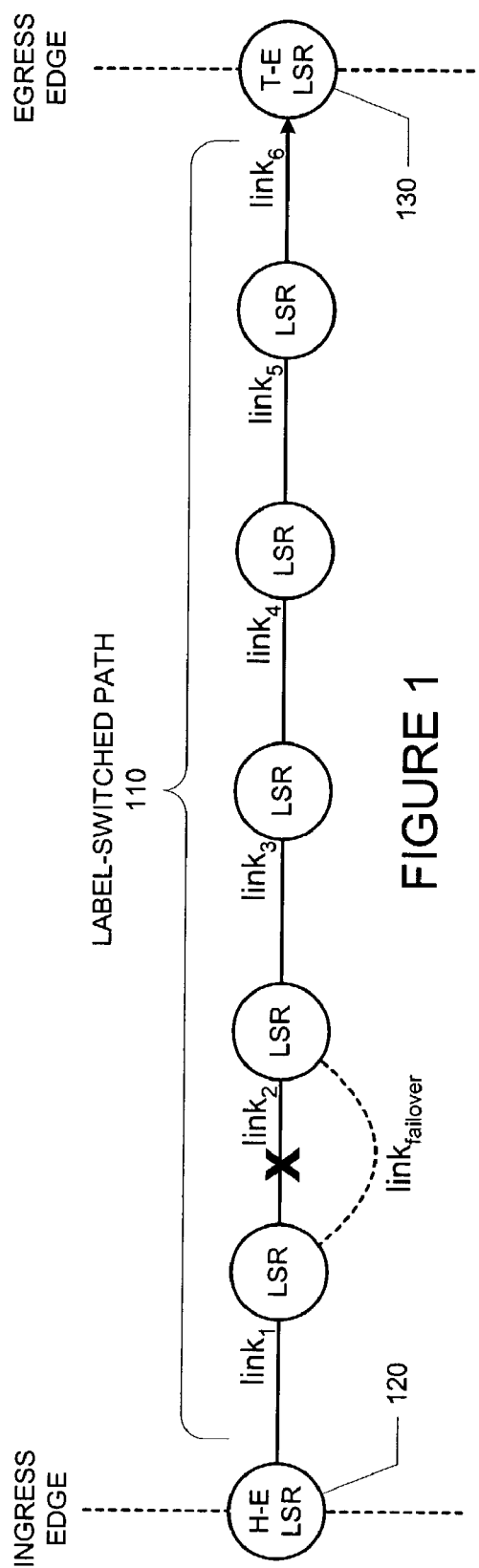
FIG. 1 illustrates an LSP including a head-end (or ingress) LSR, intermediate (or transit) LSRs, and a tail-end (or egress) LSR.
Figure 2:
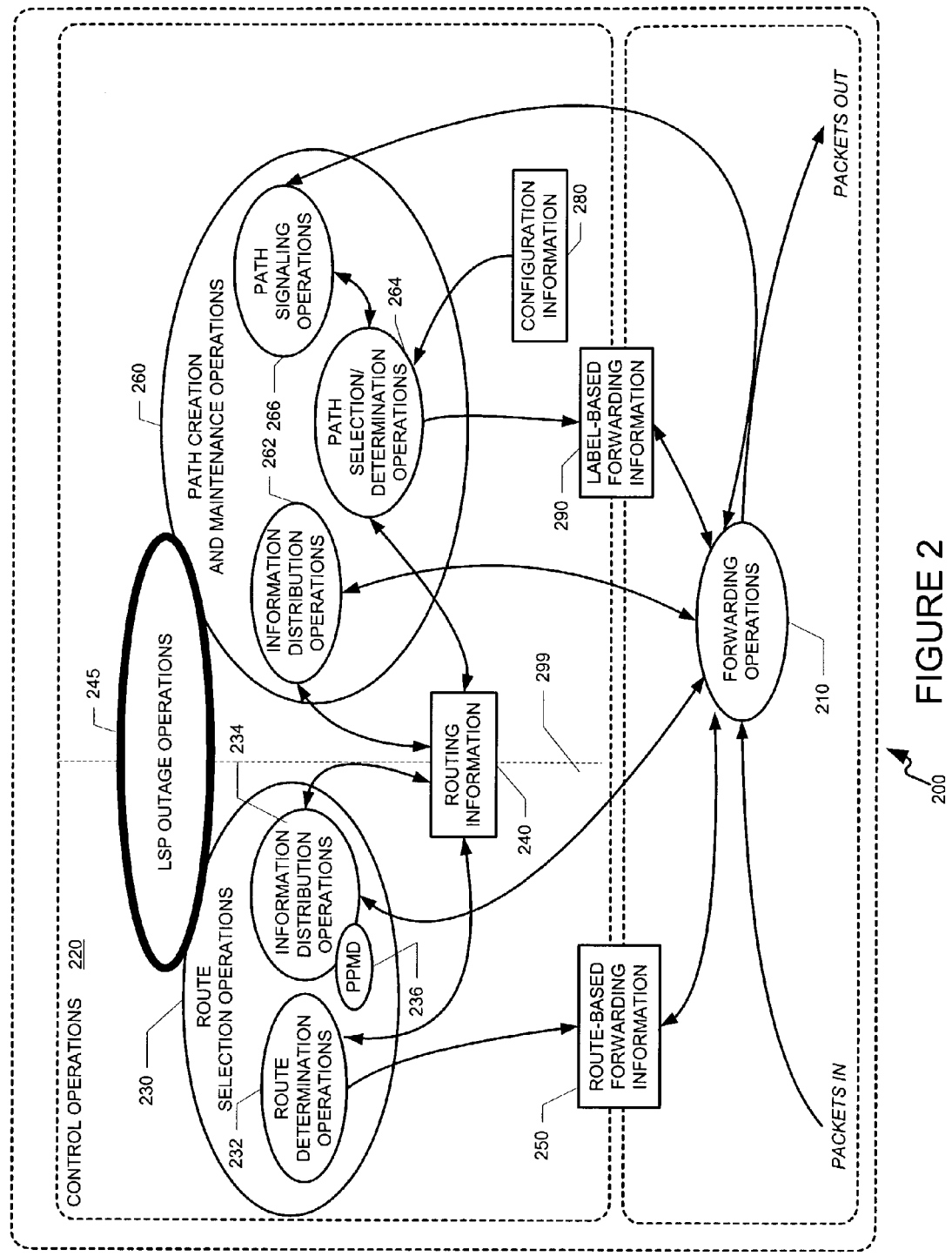
FIG. 2 is a bubble chart of a router which may operate in a manner consistent with the principles of the present invention.

FIG. 2 is a bubble-chart of an exemplary router 200 in which the present invention may be used. Router 200 may include a packet forwarding operations 210 (part of a "data plane") and a control operations 220 (part of a "control plane"). Packet forwarding operations 210 may forward received packets based on route-based forwarding information 250 and/or based on label-based forwarding information 290, such as LSP information.

Regarding control operations 220, the operations and information depicted to the right of dashed line 299 are related to creating and maintaining virtual links, such as LSPs, while the operations and information depicted to the left of the dashed line 299 are related to creating routes.

The route selection operations 230 may include information distribution operations 234 and route determination operations 232. Information distribution operations 234 may be used to discover network topology information, store it as routing information 240, and distribute such information to other nodes of the network. For example, adjacency information may be discovered. In the open shortest path first (OSPF) IGP, "neighbor hello" queries can be used to detect a down connection or adjacency on the order of a few seconds. A periodic packet management daemon (PPMD) 236 can be used to permit much quicker IGP neighbor hellos. For example, in one embodiment PPMD 236 breaks out management of protocol HELLO packets from the individual routing processes. A routing protocol daemon (RPD) is typically used as route selection operations 230 for processing all routing and protocol related information, including HELLOs. When PPMD 236 is used, however, if RPD experiences a schedule slip, adjacencies and BGP peers will remain up because PPMD offloads from RPD task of maintaining peers and adjacencies. This feature facilitates many things, such as the implementation of non-stop, hitless RE fail-over. Thus, PPMD separates out the real-time component of the RPD (e.g., HELLO generation and adjacency management) into a separate daemon or module. RPD may program HELLO transmission and adjacencies into PPMD across a socket. PPMD runs at a very high scheduling priority, has very little to do, and can preempt RPD when needed. Moreover, with PPMD, adjacency timeouts can be reduced to low levels for reasonable topologies. Naturally, the invention can be used with other techniques to permit quicker IGP neighbor hellos. Route determination operations 232 may use routing information 240 to generate route-based forwarding information 250.

The path creation and maintenance operations 260 may include an information distribution operations 262, a path selection/determination operations 264, and path signaling operations 266. Information distribution operations 262 may be used to obtain information about the network, store such information as path information (not shown), and distribute such information. Path determination/selection operations 264 may use routing information 240, the path information and/or configuration information 280 to generate label-based forwarding information 290, such as LSPs. Path signaling operations 266 may be used to accept and disseminate label-based forwarding information. Path signaling protocols may include any path signaling protocol, such as RSVP, the label distribution protocol (LDP) and the border gateway protocol (BGP).

Consistent with the principles of the invention, exemplary router 200 may also include LSP outage operations 245 for detecting and responding to outages. These operations may be implemented as extensions to route selection operations 230 and path creation and maintenance operations 260, though other implementations are possible. Although not shown, path creation and maintenance operations 260 may include failover operations.

§4.2 EXEMPLARY METHODS, APPARATUS AND DATA STRUCTURES

Exemplary methods, apparatus, and data structures for performing LSP outage operations will now be described.

Figure 3:
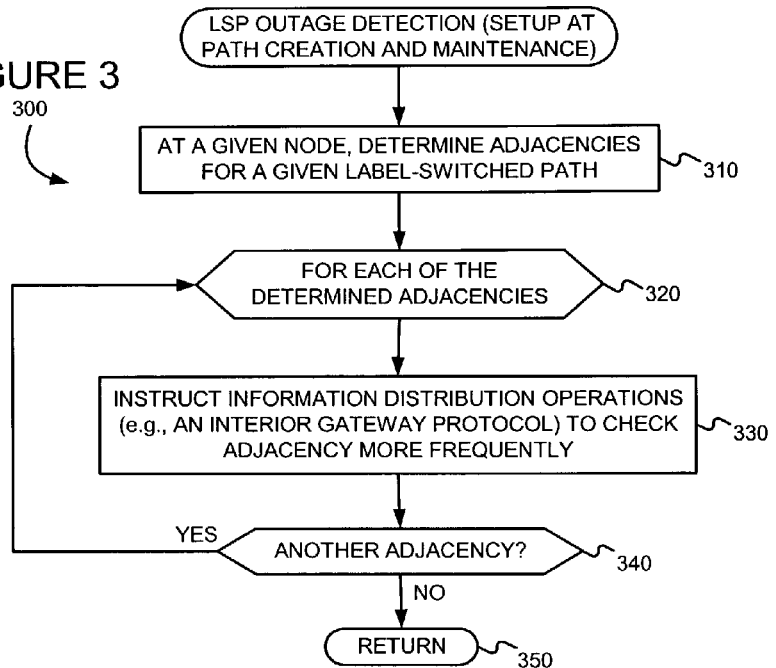
FIG. 3 is a flow diagram of an exemplary method for setting up LSP outage detection in a manner consistent with the principles of the present invention.
Figure 4:
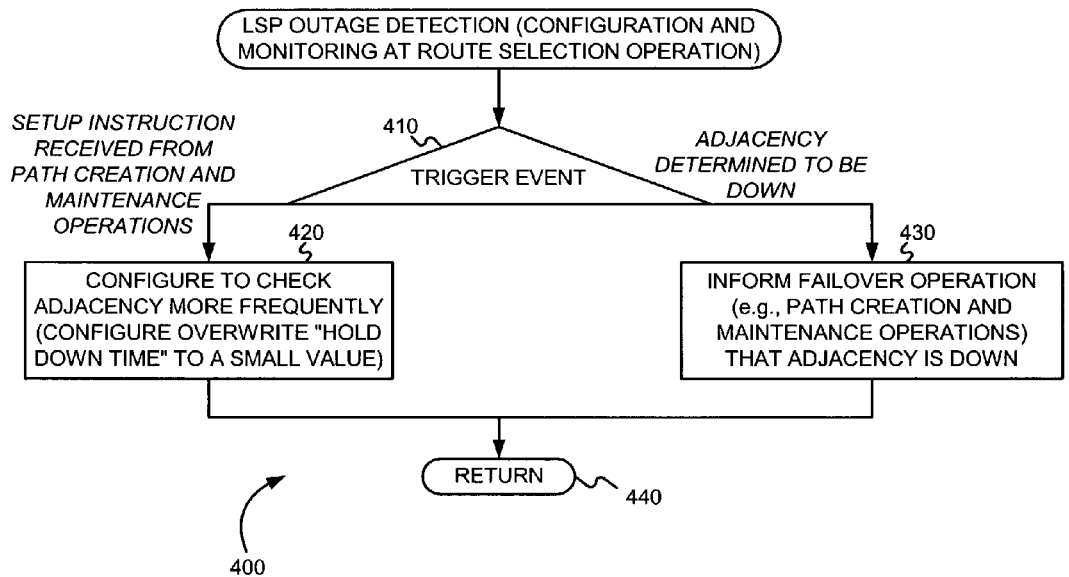
FIG. 4 is a flow diagram of an exemplary method for setting up LSP outage detection and detecting LSP outage in manners consistent with the principles of the present invention.
Figure 5:
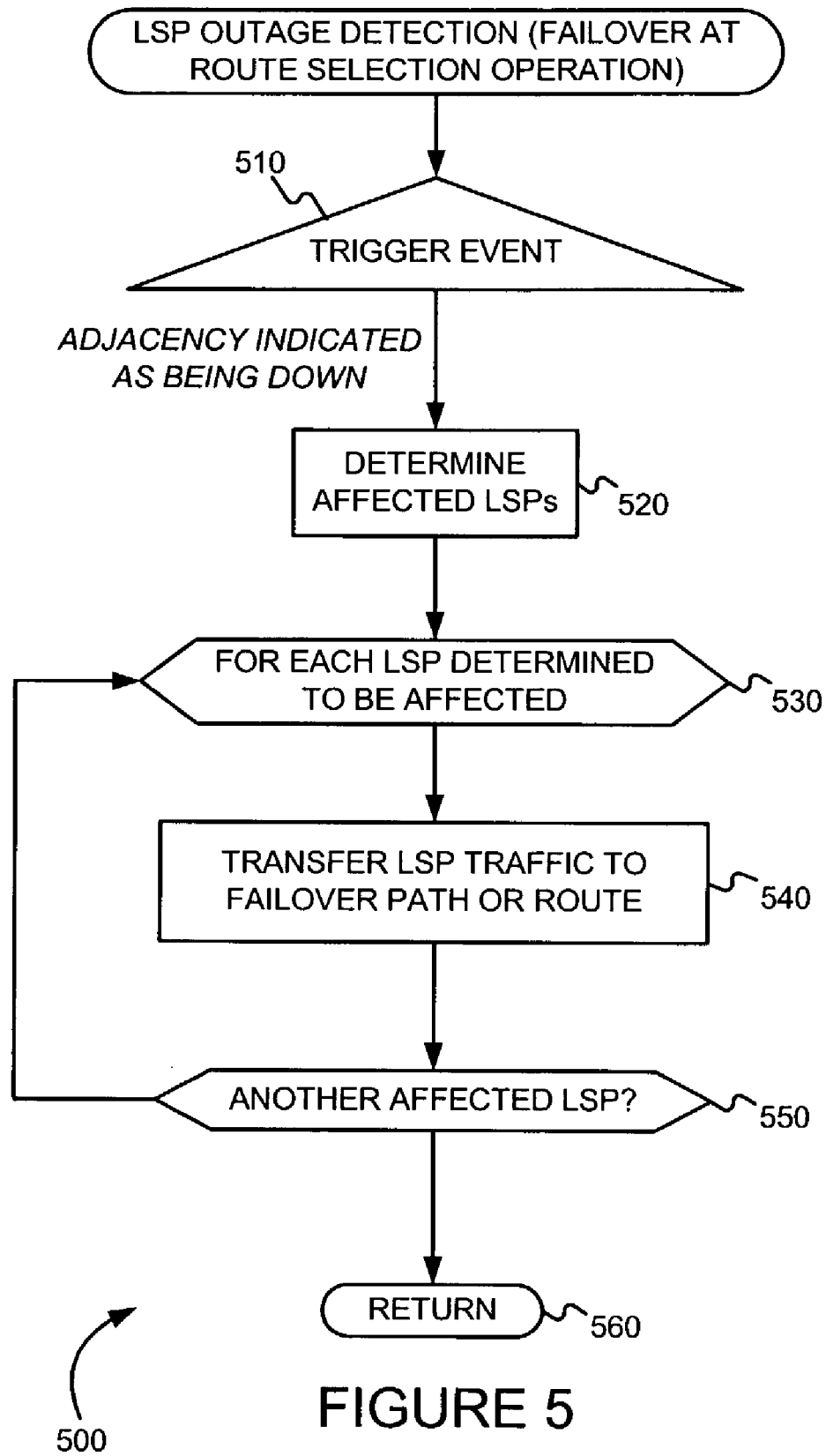
FIG. 5 is a flow diagram of an exemplary method for responding to a failed connection (link, interface, or node).

FIGS. 3-5 are flow diagrams of exemplary methods for performing various aspects of LSP outage protection. These methods concern (i) setting up LSP outage protection, (ii) detecting an LSP outage, and (iii) a responding to a detected LSP outage. These methods may be performed at the route selection operations 230 and the path creation and maintenance operations 260.

FIG. 3 is a flow diagram of an exemplary method 300 for setting up LSP outage detection in a manner consistent with the principles of the present invention. Method 300 may be performed as an extension of path creation and maintenance operations 260 and illustrates acts that may be used to protect a given LSP. Method 300 may be repeated a number of times to protect different LSPs. The LSPs to be protected may be configured ahead of time. For example, a user can set up, from a control console, LSPs that need to be tracked closely.

At a given node, adjacencies for a given LSP are determined. (Block 310) For each of the determined adjacencies (loop 320-350), the given LSP is mapped to (or otherwise associated with) the adjacency, and information distribution operations are instructed to check the adjacency more frequently. (Blocks 330 and 340) If the information distribution operations run an IGP protocol, for example, the IGP protocol may be instructed to register so-called "upcall functions". Thus, for example, when RSVP finds out that its neighbor isn't there, IGP is used to verify adjacency quicker. When all adjacencies have been processed, method 300 is left via RETURN node 360. Referring to block 340, the information distribution operations may be a route selection operations 230, such as IGP for example. More specifically, IGP may be instructed to issue "hello neighbor" queries much more frequently (e.g., on the order of msec, and perhaps at least every 50 msec, rather than seconds).

FIG. 4 is a flow diagram of an exemplary method 400 for setting up LSP outage detection and detecting LSP outage in manners consistent with the principles of the present invention. Method 400 may be performed as an extension of route selection operations 230. As shown, different branches of method 400 are performed in response to different trigger events. (Trigger block 410) More specifically, if a setup instruction is received (Recall block 340 of FIG. 3.), the node is configured to check adjacency more frequently (Block 420) before method 400 is left via RETURN node 440. In one embodiment, IGP overwrites a "hold down" time to a small value. In an embodiment in which a router includes a routing protocol module (or daemon) (RPD) and a periodic packet management module (or daemon) (PPMD), the hold down time (e.g., the time an adjacency is kept up without hearing a hello reply, before it goes down) parameters are exchanged between the RPD and the PPMD. Referring back to trigger block 410, if an adjacency is determined to be down, a failover operations, which may be a part of path creation and maintenance operations, is informed that the adjacency is down (Block 430) before method 400 is left via RETURN node 440. For example, in one exemplary embodiment, IGP may use the pre-registered upcall functions to inform an RSVP module of an adjacency being down. The failover operations may use known fast reroute techniques for example.

FIG. 5 is a flow diagram of an exemplary method 500 for responding to a failed connection (link, interface, or node). Method 500 may be performed as an extension of path creation and maintenance operations 260. As indicated by trigger block 510, the main actions of method 500 are performed in response to an indication that an adjacency is down. LSPs affected by the down adjacency are determined. (Block 520) For example, recall from block 330 of FIG. 3 that LSPs may be mapped to, or otherwise associated with, adjacencies. For each of the determined LSPs (loop 530-550), traffic that would normally be sent over the LSP is transferred to a failover link, path, or route. (Block 540) For example, in one embodiment, an RSVP module may use various recovery functions, such as the fast reroute described in the above-referenced draft. After all affected LSPs have been processed, the method 500 is left via RETURN node 560.

Figure 6:
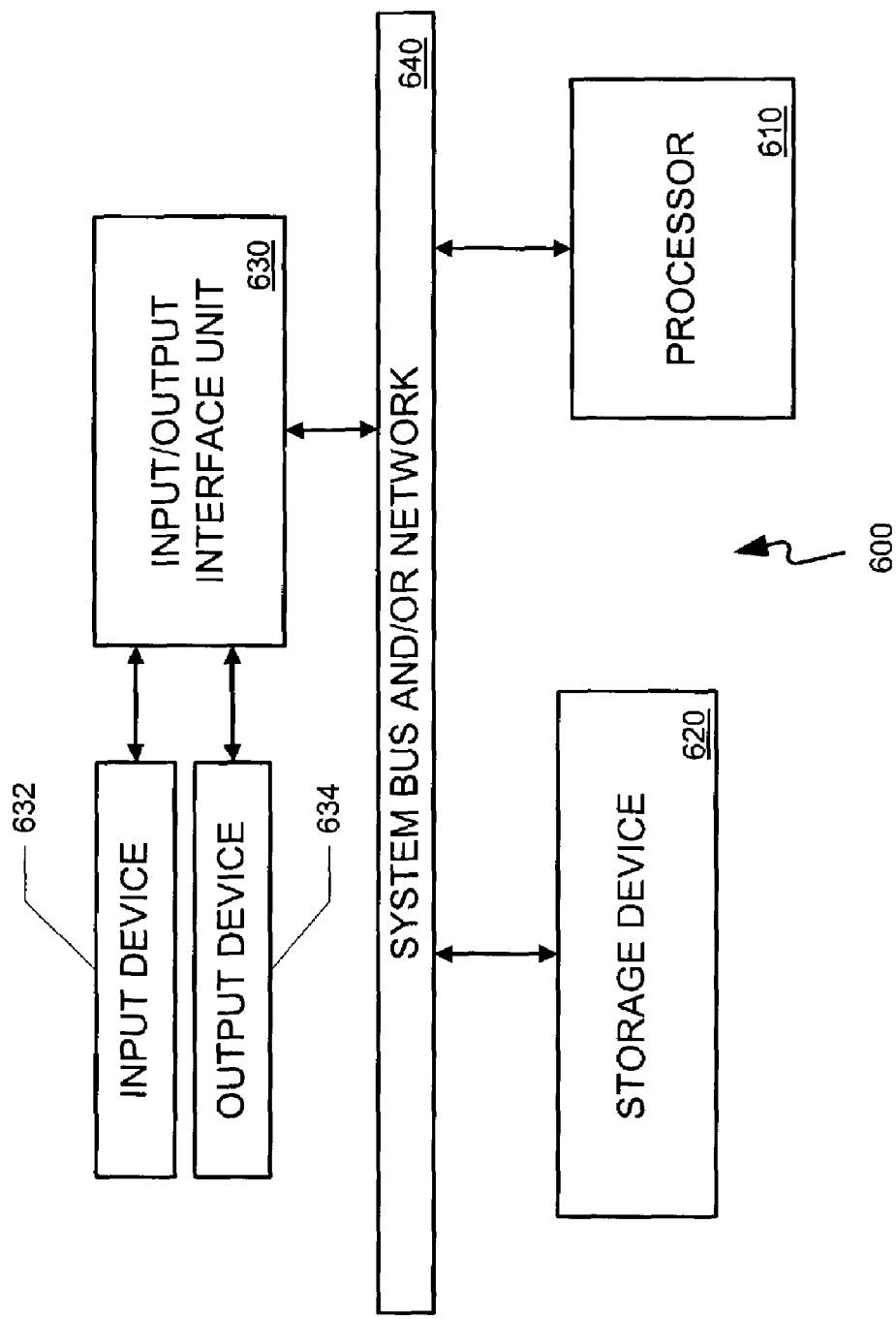
FIG. 6 is a block diagram of an apparatus that may be used to perform operations consistent with the present principles of the invention.

FIG. 6 is high-level block diagram of a machine 600 which may perform one or more of the operations discussed above. Machine 600 basically includes a processor 610, an input/output interface unit 630, a storage device 620, and a system bus and/or a network 640 for facilitating the communication of information among the coupled elements. An input device 632 and an output device 634 may be coupled with the input/output interface 630. Operations of the present invention may be effected by the processor 610 executing instructions. The instructions may be stored in the storage device 620 and/or received via the input/output interface 630. The instructions may be functionally grouped into processing modules. Although not shown, more than one of some or all of these components may be provided.

Machine 600 may be a router or a label-switching router for example. In an exemplary router, the processor 610 may include a microprocessor, a network processor, and/or (e.g., custom) integrated circuits. In the exemplary router, the storage device 620 may include one or more ROM, RAM, SDRAM, SRAM, SSRAM, DRAM, flash drive, hard disk drive, and/or flash card. At least some of these storage device 620 may include program instructions defining an operating system, a protocol module (e.g. daemon) and/or other modules. In one embodiment, the methods of the present invention may be performed by a microprocessor executing stored program instructions (e.g., defining a part of the protocol module or daemon). At least a portion of the machine executable instructions may be stored (temporarily or more permanently) on the storage device 620 and/or may be received from an external source via an input interface unit 630. Finally, in the exemplary router, the input/output interface unit 630, input device 632 and output device 334 may include interfaces to terminate communications links.

Naturally, the operations of the present invention may be performed on systems other than routers. Such other systems may employ different hardware and/or software.

§4.3 ILLUSTRATIVE EXAMPLE

Figure 7:
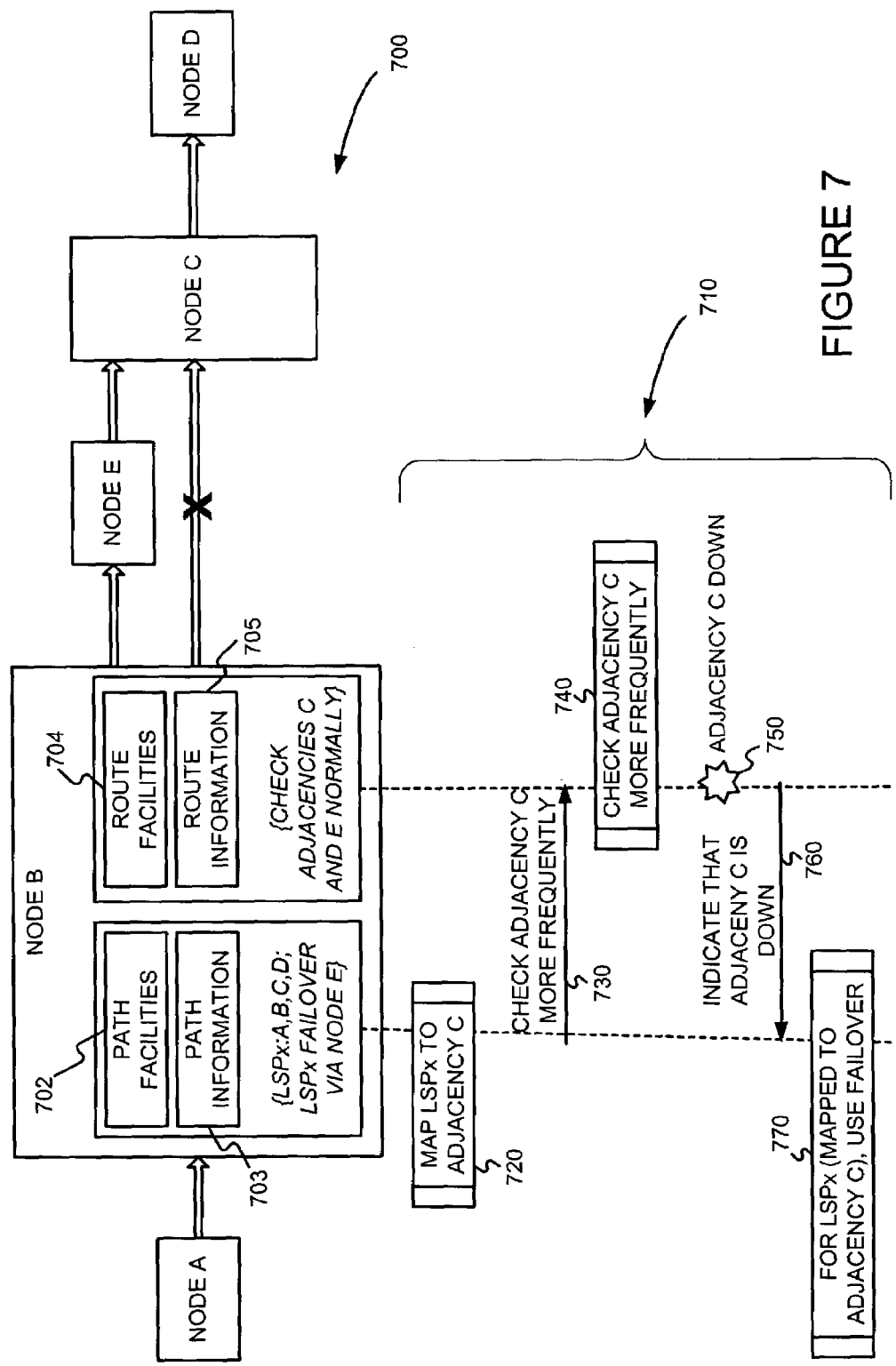
FIG. 7 is a diagram illustrating an example in which an embodiment of the present invention is implemented in a node of an LSP.

FIG. 7 is a diagram illustrating an example in which an embodiment of the present invention is implemented in a node of a LSP. System 700 includes nodes A, B, C and D of an $LSP_x$, as well as a node E having a link with node B and a link with node C. Node B includes path facilities 702 and information 703, as well as route facilities 704 and information 705. Path facilities 702 may be a processor executed signaling protocol, such as RSVP-TE. The path information 703 may include information about $LSP_x$, including failover information. Route facilities 704 may be a processor executed interior gateway protocol such as IS-IS or OSPF. Route information 705 may include the adjacencies that node B is to check in accordance with the IGP.

Initially, path facilities 702 may map the $LSP_x$ to node B's adjacency with node C. (Block 720) Path facilities 702 may then instruct route facilities 704 to check the adjacency with node C more often. (Message 730) In response, route facilities 704 may check the adjacency with node C more often. (Block 740) Some time later, suppose that the link between nodes B and C fails, as indicated by the "X" in FIG. 7. (Star 750) Since route facilities 704 are checking adjacency more frequently, they will quickly determine that node B's adjacency with node C is down and can quickly inform path facilities 702 of this fact. (Message 760) Path facilities 702 may then use the failover link, path, or route (via node E) for $LSP_x$, since $LSP_x$ was mapped to adjacency C. (Block 770)

§4.4 CONCLUSIONS

As can be appreciated from the foregoing disclosure, the invention discloses apparatus, data structures and methods for quickly detecting an LSP outage. In one embodiment, such detection may occur within 50 msec of the outage. Further, in nodes in which the path operations or facilities are implemented in software, the invention reduces processor overhead. Although the present invention may be implemented with hardware signaling, it need not be. Thus, the present invention can be used with interfaces that don't support hardware signaling, such as shared media interfaces like Ethernet and Gigabit Ethernet.

It should be understood that other embodiments consistent with the principles of the invention may also be implemented without departing from the spirit and scope of the invention. For example, the present invention could be used with various path creation and maintenance protocols (such as RSVP-TE and fast reroute), as well as routing protocols (such as IGP). Other signaling protocols may be used to set up the LSP and other protocols, such as IS-IS and OSPF may be used to check adjacencies.

What is claimed is:

1. For use with a node supporting a routing protocol which periodically checks adjacencies in accordance with a first time period, a method for quickly detecting an outage in a label-switched path, the method comprising:
    a) associating the label-switched path with an adjacency used in the label-switched path;
    b) checking the adjacency used in the label-switched path periodically, in accordance with a second time period which is less than the first time period, while continuing to check at least some adjacencies not used in the label-switched path in accordance with the first time period; and
    c) if the adjacency goes down, informing a facility responsible for failover of the label-switched path that the adjacency is down.

2. The method of claim 1 wherein the adjacency includes a next downstream node of the label-switched path, a link to the next downstream node, and interfaces terminating the link.

3. The method of claim 2 wherein the interfaces are shared-media interfaces.

4. The method of claim 2 wherein the interfaces are Ethernet or Gigabit Ethernet interfaces.

5. The method of claim 1 wherein the act of checking the adjacency periodically, in accordance with a second time period, includes changing a frequency with which the adjacency is checked from over one second to under one second.

6. The method of claim 1 wherein the act of checking the adjacency periodically, in accordance with a second time period, includes changing a frequency with which the adjacency is checked from at least one second to no more than 50 msec.

7. The method of claim 1 wherein the act of associating the label-switched path with an adjacency is performed by a path creation and maintenance operations.

8. The method of claim 1 wherein the act of associating the label-switched path with an adjacency is performed by a resource reservation protocol module.

9. The method of claim 1 wherein the act of checking the adjacency periodically, in accordance with a second time period, is performed by a route selection operations.

10. The method of claim 1 wherein the act of checking the adjacency periodically, in accordance with a second time period, is performed by an interior gateway protocol module.

11. The method of claim 10 wherein the interior gateway protocol module is one of intermediate system-intermediate system and open shortest path first.

12. The method of claim 1 wherein the act of checking the adjacency periodically, in accordance with a second time period, is performed by a periodic packet management module.

13. The method of claim 12 wherein the periodic packet management module is a high scheduling priority facility which can preempt the route selection operations.

14. The method of claim 12 wherein the act of checking the adjacency periodically, in accordance with a first time period, is performed by individual routing processes.

15. The method of claim 1 further comprising:
    d) in response to the facility responsible for failover of the label-switched path being informed that the adjacency is down, selecting a preexisting alternative interface over which to forward traffic of the label-switched path.

16. The method of claim 15 wherein the facility responsible for failover effects a fast reroute scheme.

17. A storage device storing machine-executable instructions which, when executed by a machine, perform the method of claim 1.

18. For use with a node supporting a routing protocol which periodically checks adjacencies in accordance with a first time period, a method for quickly detecting an outage in a label-switched path, the method comprising:
- a) associating, with a first facility, the label-switched path with an adjacency used in the label-switched path;
- b) instructing a second facility to check the adjacency used in the label-switched path periodically, in accordance with a second time period which is less than the first time period;
- c) checking, With the second facility, the adjacency periodically, in accordance with the second time period, while continuing to check at least some adjacencies not used in the label-switched path in accordance with the first time period; and
- d) if the adjacency goes down, informing, by the second facility, a third facility responsible for failover of the label-switched path that the adjacency is down.

19. The method of claim 18 wherein the adjacency includes a next downstream node of the label-switched path, a link to the next downstream node, and interfaces terminating the link.

20. The method of claim 19 wherein the interfaces are shared-media interfaces.

21. The method of claim 19 wherein the interfaces are Ethernet or Gigabit Ethernet interfaces.

22. The method of claim 18 wherein the act of checking the adjacency periodically, in accordance with the second time period, includes changing a frequency with which the adjacency is checked from over one second to under one second.

23. The method of claim 18 wherein the act of checking the adjacency periodically, in accordance with a second time period, includes changing a frequency with which the adjacency is checked from at least one second to no more than 50 msec.

24. The method of claim 18 wherein the second facility is an interior gateway protocol module.

25. A storage device storing machine-executable instructions which, when executed by a machine, perform the method of claim 18.

26. Apparatus for quickly detecting an outage in a label-switched path, for use with a node of the label-switched path, the apparatus comprising:
- a) a path facility adapted to map the label-switched path to an adjacency of the label-switched path; and
- b) a route facility adapted to periodically check adjacencies of the node in accordance with a first time period,
  wherein the path facility is adapted to instruct the route facility to check the adjacency of the label-switched path periodically, in accordance with a second time period which is less than the first time period, while continuing to check at least some adjacencies not used in the label-switched path in accordance with the first time period, and to inform it if the adjacency of the label-switched path goes down.

27. The apparatus of claim 26 wherein the route facility is adapted to inform the path facility if the adjacency of the label-switched path goes down.

28. The apparatus of claim 26 further comprising:
- c) a failover facility adapted to back up the label-switch in the event that it is informed that the adjacency of the label-switched path goes down.

29. The apparatus of claim 28 wherein the path facility includes the failover facility.

30. The method of claim 28 wherein the failover facility is a fast reroute module.

31. The method of claim 26 wherein the path facility is a resource reservation protocol module.

32. The method of claim 26 wherein the route facility is an interior gateway protocol module.

33. For use with a node supporting a routing protocol which periodically checks adjacencies in accordance with a first set of at least one parameter used by the routing protocol, a method for quickly detecting an outage in a label-switched path, the method comprising:
- a) associating the label-switched path with an adjacency used in the label-switched path;
- b) checking, using the routing protocol, the adjacency used in the label-switched path in accordance with a second set of at least one parameter used by the routing protocol which is different from the first set of at least one parameter used by the routing protocol to check other adjacencies, while continuing to check at least some adjacencies not used in the label-switched path in accordance with the first set of at least one parameter; and
- c) if the adjacency goes down, informing a facility responsible for failover of the label-switched path that the adjacency is down.

34. For use with a node supporting a routing protocol which checks adjacencies, a method comprising:
- a) determining if an interface of the node is associated with a label-switched path;
- b) if it is not determined that the interface of the node is associated with a label-switched path, then checking an adjacency associated with the interface periodically, in accordance with a first time period; and
- c) if it is determined that the interface of the node is associated with a label-switched path, then checking an adjacency associated with the interface periodically, in accordance with a second time period which is less than the first time period, whereby an interface of a node associated with the label-switched path is checked more frequently than an interface of a node not associated with the label-switched path.

35. The method of claim 34 wherein the act of checking an adjacency includes issuing a hello query.

* * * * *